Figure 1:
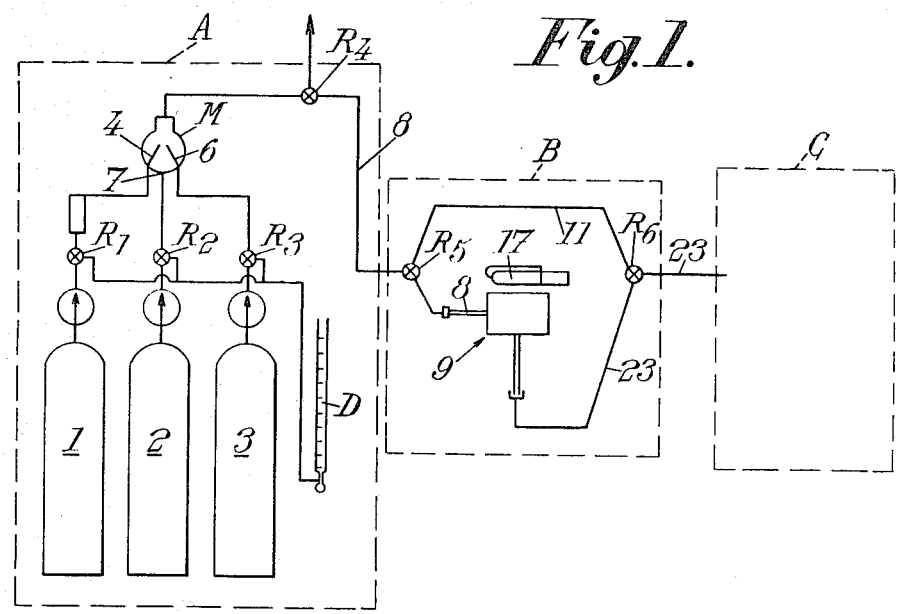

United States Patent [19]
Juillet et al.

[11] 3,781,194
[45] Dec. 25, 1973

[54] PROCESS FOR THE PHOTOCATALYTIC OXIDATION OF HYDROCARBONS INTO ALDEHYDES AND KETONES

[75] Inventors: Francois Juillet; Stanislas Teichner; Marc Formenti, all of Villeurbanne, France

[73] Assignee: Agence Nationale de Valorisation de la Recherche, Paris, France

[22] Filed: Sept. 15, 1970

[21] Appl. No.: 72,341

[30] Foreign Application Priority Data
Sept. 15, 1969 France .................. 6931280

[52] U.S. Cl. ...... 204/162 R, 260/586 B, 260/597 A, 260/597 B, 260/604 HF, 260/604 R
[51] Int. Cl. ............................ B01j 1/10, C07c 3/24
[58] Field of Search ............... 204/162 R, 162 XM, 204/162 HF, 158 R; 260/597 R, 597 A, 597 B, 604 HF, 604 AC, 604 R, 586 B

[56] References Cited
UNITED STATES PATENTS

| | | | |
|---|---|---|---|
| 3,218,368 | 11/1965 | Neale | 260/597 R |
| 3,122,586 | 2/1964 | Berndt et al. | 204/162 R |
| 3,154,586 | 10/1964 | Bander et al. | 204/162 R |
| 3,600,443 | 8/1971 | Cevidalli et al. | 260/604 R |
| 3,293,291 | 12/1966 | Wattimena | 260/597 B |
| 3,301,905 | 1/1967 | Riemenschneider et al. | 260/597 B |
| 3,497,553 | 2/1970 | Trapasso | 260/604 R |
| 3,345,406 | 10/1967 | Whim et al. | 260/604 R |

*Primary Examiner*—Carl D. Quarforth
*Assistant Examiner*—Roger S. Gaither
*Attorney*—Larson, Taylor & Hinds

[57] ABSTRACT

Process for the oxidation of gaseous hydrocarbons or hydrocarbons in the gaseous or vapour state, in heterogeneous phase, which comprises producing, at a temperature below 100°C, a circulation or continuous flow of a gaseous mixture or of gas and vapours containing the hydrocarbon to be oxidised and oxygen into contact with a catalyst subjected to ultra-violet radiation, this catalyst being constituted by a metal oxide containing or retaining by adsorption molecules of oxygen which are mobile under irradiation, such as titanium dioxide, the ultra-violet radiation being at least partly within the domain of wavelengths lower than the wave length of the radiation whose energy is that of the prohibited bandwidth of the oxide.

10 Claims, 2 Drawing Figures

PATENTED DEC 25 1973 3,781,194

PROCESS FOR THE PHOTOCATALYTIC OXIDATION OF HYDROCARBONS INTO ALDEHYDES AND KETONES

The invention relates to a process for the oxidation of gaseous hydrocarbons or hydrocarbons in the vapour state at low temperature, and it relates more particularly but not exclusively to a process for the oxidation of saturated hydrocarbons containing at least three carbon atoms and of unsaturated hydrocarbons, which may be branched, this being the application of the invention that appears to be of the greatest interest.

Several processes are known for the catalytic oxidation of hydrocarbons in contact with catalysts constituted by metal oxides, such as $TiO_2$, $ZnO$, $ThO_2$, $SiO_2$, $Al_2O_3$, $Fe_2O_3$, $WO_3$, $NiO$, $V_2O_5$.

These processes, however, can in general be performed only at somewhat high temperatures.

Moreover, and in particular in the case in which the hydrocarbons subjected to the oxidation are saturated, the oxidation reaction, when it can be initiated, generally brings about complete oxidation of these hydrocarbons. The difficulty in performing these oxidation reactions at low temperature may undoubtedly be attributed to the low mobility of the oxygen atoms of the surface of the catalysts on the one hand and, in the case of saturated hydrocarbons, to the low reactivity of the latter.

It is of course already known that it is possible to increase the mobility of the oxygen atoms of the catalyst, in particular of titanium oxide, by irradiation thereof with ultra-violet rays.

However, where this irradiated catalyst has already been placed in contact with mixtures of hydrocarbons and oxygen in a closed chamber, in such manner as to enable the rate of reaction to be detected by the diminution of the initial pressure of the gases introduced into the chamber and where moreover, it has been possible to determine, in particular by infra-red spectrometry, the presence of oxidation products amongst the adsorption products retained on the catalyst at the end of the reaction, the recovery of these adsorbed products has been found to be practically impossible at the ambient temperature (at which the adsorption had in general been effected), the desorption being capable of being effected only under conditions (for example prolonged evacuation in vacuo at a high temperature, for example of the order of 170°C) in which it is always accompanied by degradation of the products of oxidation.

The principal object of the invention is to make these processes for the oxidation of hydrocarbons capable of complying better with practical requirements, in particular to overcome the above-mentioned difficulties and to provide a photocatalytic process for the oxidation of hydrocarbons and of recovery of the products of oxidation in the cold, this process further enabling valuable industrial products such as ketones or aldehydes to be obtained, particularly in the case in which the hydrocarbons treated are saturated hydrocarbons having at least three carbon atoms or in which they are unsaturated hydrocarbons which may be branched.

The process according to the invention for the oxidation of hydrocarbons in the gaseous or vapour state, in heterogeneous phase, is characterized by the feature that there is produced, at a temperature not exceeding about 100°C, preferably at the ambient temperature, a continuous flow of a mixture of gases or of gas and vapours containing the hydrocarbon to be oxidised and of oxygen into contact with a catalyst subjected to the action of ultra-violet radiation, this catalyst being constituted by a metal oxide containing or retaining by adsorption molecules of oxygen which are mobile under irradiation.

It has in fact been found that by performing the reaction of photo-oxidation of the hydrocarbon in a dynamic system, by circulation of the gaseous mixture in contact with the catalyst, the products of oxidation formed may be collected at the outlet of the system, in particular at the ambient temperature, without it being necessary to proceed to desorption reactions in vacuo.

The yield of oxidation products and the selectivity of the reaction are considerably increased when the catalyst is in the form of particles of reduced porosity or, more preferably, of spherical particles of practically no porosity.

There is thus obtained a process for the oxidation of hydrocarbons at low temperature providing in particular carbon dioxide starting from methane and ethane and the first linear terms of unsaturated hydrocarbons and (it is here that the principal interest of the invention resides) oxidation products such as ketones or aldehydes of very high selectivity starting in particular from saturated hydrocarbons having at least three carbon atoms and unsaturated hydrocarbons which may be branched.

The oxidation products capable of being obtained from gaseous hydrocarbons of the latter category may vary from one hydrocarbon to another. In particular, and for example, the oxidations performed in accordance with the invention of isobutane, isobutene and of propane yield acetone; that of n-butane yields butanone; that of toluene yields phenol, etc.

The invention includes, apart from the features disclosed above, certain other features which are preferably used at the same time and to which more detailed reference will be made below in connection with preferred methods of performing the invention which will be described in a more detailed but non-limiting manner.

Figure 2:
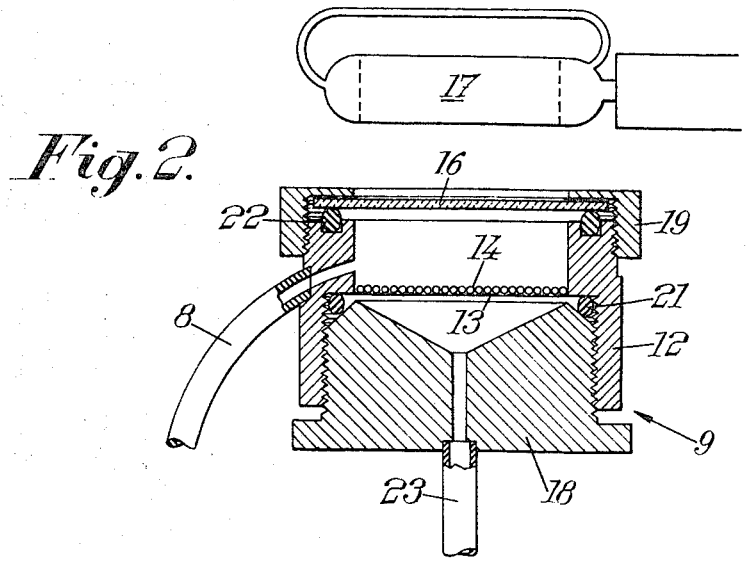

FIG. 1 is a diagrammatic illustration of a plant in which the process according to the invention may be performed, and FIG. 2 is a diagrammatic cross section through the reactor of this plant.

The circulation in accordance with the invention of the gaseous mixture (it being understood that the expression "gaseous mixture" includes those in which a part of the constituents may be constituted by vapours) containing the hydrocarbon to be oxidised and oxygen in contact with the catalyst, in particular titanium oxide, exposed to ultra-violet irradiation, at a temperature below 100°–110°C, preferably at the ambient temperature, may be effected by recourse to any of the conventional techniques for putting a gaseous fluid and a catalyst in contact. This may for example be a fixed bed over which the mixture flows, or as in the experimental device shown diagrammatically in the drawing, it may be traversed by the gaseous mixture.

The catalyst may also be "fluidised" by any of the means known in this field, for example may be stirred by paddles in a rotating enclosure with a horizontal axis, or be maintained in this state by means of cyclones or the like.

In all cases, it will of course be necessary to ensure good exposure of the catalyst to the ultra-violet radiations. In the case of fixed beds, there will be used thin layers of catalyst the thicknesses of which should not exceed the values for which some particles of the catalyst would not be, at least partially, exposed to the ultra-violet radiation furnished by the sources located in the vicinity of these layers.

As regards more particularly the physical constitution of the catalyst, it has been found, surprisingly, that the yield and the selectivity of the conversion are considerably increased when the catalyst has a reduced porosity, the other operating conditions (temperature, wave domain of the ultra-violet radiations, output, etc.) being the same.

In particular, advantageous results are obtained (as appears from the table of results given below) with oxides obtained by hydrolysis of the alcoholate of the corresponding metal dissolved in an alcohol or benzene medium, followed by removal of the solvent under hypercritical conditions in an autoclave, in other words, above the critical temperature of the solvent (Theses by MM. Nicolaon (1968) and Viccarini (1969), Lyon). The oxides obtained are characterized by the presence of large pores and in general by a low porosity.

It has been found that a thermal treatment of the oxides thus obtained, in order to eliminate the superficial —OH ions, in particular at temperatures varying from 150° to 300°C according to the nature of the oxide used (Theses by Nacache, Paris 1960 and Viccarini, Lyon 1969, or the article by M. Boehm; Chemical Identification of Surface Groups — Advances in Catalysis, 1966, Volume XVI, p. 179) for 2 to 4 hours in a forced vacuum or in dry nitrogen provides a notable increase in the yield of oxidation and more particularly the yields of oxidation products.

However, still better results are obtained with oxides, substantially non-porous, in the form of spherical particles, obtained for example:

either, when the metal of the oxide concerned can exist in the form of a volatile chloride or oxychloride, by the method called "flame reduction" described in French patent specification No. 1.207.154, that is to say by drawing vapours of the chloride or oxychloride into the flame of an oxyhydrogen burner, the oxide being collected by electrostatic precipitation and freed from the chlorine atoms that it may retain by adsorption, in particular by a thermal treatment of the precipitate for a sufficient period of time in a current of pure and dry air;

or, by thermal decomposition of the vapour of an alcoholate of the metal concerned drawn by a current of inert gas, such as nitrogen, into a reactor associated with an electrostatic precipitator for recovering the particles formed in gaseous phase, at a temperature (for example between 700° and 850°C) which is a function of the required vapour pressure of the alcoholate, which itself is a function of the dimensions of the particles required (according, for example, to 1) K.S. Mazdiyasni, C.T. Lynch. Journees d'etudes sur les solides finement divises — Saclay 27,28,29 September, 1967, p. 9, Doc. Francaise 1968;

2. K.S. Mazdiyasni, C.T. Lynch, J.S. Smith. Journ. American Ceramic Society, 1965, Vol. 48 n° 7, p. 372; and 3. 66th Annual Meeting of the American Ceramic Society, Chicago, Ill., 20, April 1964).

The gas drawn in may, where appropriate, contain a reducing gas such as hydrogen, or may be wholly constituted by this reducing as, this atmosphere having the effect of creating in the oxides treated a defect in stoichiometry by loss of oxygen atoms, these or the electrons liberated in the crystalline lattice of the oxide being then capable of contributing to the the activity of the catalyst under irradiation or even of causing the appearance of photocatalytic activity in some oxides which otherwise would have none at all. For example, alumina produced under these conditions by thermal decomposition of an isobutylate or an isopropylate of aluminium has been found to exhibit an appreciable photocatalytic activity under irradiation.

The effectiveness of the photocatalytic oxidation also depends on the wave domain of the ultra-violet radiations to which the catalyst is exposed. For each oxide the wave lengths used must have greater an energy than energy corresponds to the prohibited band of the oxide concerned. They much be greater than the wavelengths for which the energy imparted to the electrons of the oxide is too important to permit them to take part to the reaction of oxidation. Generally, however these last wavelengths are already at the extreme limit of or beyond the visible radiation spectrum. The minima wavelengths may be determined experimentally for each oxide considered. Thus it has been observed, for example, that with titanium oxide obtained in the flame reactor and having a surface of 90 m$^2$/g, the best yields are obtained for wavelengths that are between 2,200 A and 3,400 A, this activity diminishing for wavelengths above 3,400 A and becoming negligible for wavelengths equal to or above 3,850 A.

It has been found that in the "active" wave domain the quantic yield, which is expressed by the ratio of the number of moles of the oxidation product formed to the quantity (determined in particular by microcalorimetry) of photons active in the course of the photocatalysis, may be considerable. In particular, the quantic yield from the oxidation of isobutane in acetone in the presence of titanium oxide (anatase) obtained by the flame reactor method in the form of spherical particles having a surface of 90 m$^2$/g, is near to 0.90–0.95 for the wave domain included between 2,700 and 3,000 A. It is still 0.55 for wavelengths of 2,650 A.

It therefore follows from the above that there are numerous parameters on which it is possible to act in order to improve the yields of photocatalysis. In particular, they permit modification and systematic study of the optimum conditions for which it is possible to obtain very good catalytic activity.

The output of the reaction is practically independent of the temperature at which the reaction is performed, at least in the range of temperatures in which the catalyst is not susceptible degradation. In particular the quantities of the products of oxidation and of carbon dioxide remain substantially the same in a range of reaction temperatures between 30°C and 100°C approximately. The heating of the catalyst may even cause its deterioration. For example at reaction temperatures above 110°C in the case of titanium dioxide a diminution of its catalytic activity is observed. The catalyst tends to become coloured dark red, this coloration being more rapid the higher the temperature.

The use of dopes may also contribute to improved performance of the catalyst. In particular the addition of slight proportions of the $Ga^{3+}$ ion (with a content of 0.1 to 0.3 atoms of gallium per cent) results in some increase in the activity of the titanium oxide catalyst.

With the object of further illustrating the invention, there will be described below some tests which were made with various hydrocarbons, these tests having in particular been performed in a plant of the type illustrated in the drawing, this plant having been more particularly operated in such manner as to permit the identification and the precise dosage of the constituents of the gaseous mixture entering the reactor of the plant and leaving it after the photocatalytic reaction.

This plant comprises in particular a first part A in which the mixture of gases is formed, a second part B comprising the reactor in which the oxidation of the hydrocarbon contained in the mixture is effected, and a third part C comprising a device for analysing the gases leaving the reactor and, where appropriate, a device for recovery of the oxidation products formed.

The mixing member M of part A is fed for example from a bottle 1 with the hydrocarbon to be oxidised, such as isobutane, a bottle 2 of oxygen and, if need be, a bottle 3 of a diluent gas (in the experiments the results of which are given later, this diluent gas was helium). These bottles are provided with needle valves $R_1$, $R_2$, $R_3$ which permit regulation of the delivery of each of the gases feeding the mixer M (measured individually for example through the intermediary of a soap bubble flow meter $D_1$).

In the apparatus illustrated the mixer M is constituted by a glass flask, which is fed with hydrocarbon and oxygen through the intermediary of capillary tubes 4 and 6 with their ends approaching and very close to one another, the inlet 7 for the diluent gas being located opposite the approaching ends.

The gaseous mixture leaving the mixer M is then passed through a conduit 8 (in which there may be included a tap $R_4$ which permits direct removal of the reaction mixture to the exterior) to the part B which in addition to the reactor 9 described below in detail with reference to FIGS. 1 and 2 includes a by-pass system 11 which enables the gaseous mixture to be passed directly into the part C in which the gaseous phase may for example bw analysed before passing into the reactor 9. Taps $R_5$ and $R_6$ control the passage of the gaseous phase through the reactor 9 or the by-pass 11.

The reactor is constructed in such manner as to permit in accordance with the invention, a dynamic flow of the gaseous mixture coming from the part A into contact with a layer of catalyst irradiated by a source of ultra-violet radiation (lamp made by the Societe Philips and known as HPK 125). For this purpose the reactor advantageously includes a cylindrical part 12 having at its base a permeable diaphragm 13, for example of inert cellulose acetate, on which the catalyst 14 is depostied and which is closed at its upper part by a quartz disc 16 that permits the irradiation of the catalyst by a source 17 of ultra-violet rays located above the cylindrical part 12 of the reactor (and the height of which relative to the reactor is preferably adjustable).

The permeable diaphragm 13 and the quartz disc 16 (which may be replaced by other filters) are held in place respectively by pieces 18 and 19 screwed on to the cylindrical part 12, tightness being ensured by sealing rings 21 and 22 arranged in the upper part and the base of the cylindrical part 12.

The gaseous mixture coming from the part A of the plant, through the conduit 8 opening into the reactor above the permeable diaphragm 13, is removed through a conduit 23 opening into the reactor below the permeable diaphragm 12, such that the gases continuously entering the reactor can leave it, also continuously, only after having passed through the thin layer 14 of catalyst.

The gases leaving the reactor 9 through the conduit 23 are passed into the part C of the plant in which they may be analysed and fractionated, in particular by means of a gaseous phase chromatographic apparatus known in itself (not illustrated), previously calibrated in relation to the gases capable of being contained in the gaseous mixture leaving the reactor.

As regards more particularly the deposition of the catalyst of the above-mentioned permeable diaphragm, use may be made of a fine mesh sieve in such manner as to form as thin a layer as possible so that all of the catalytic mass may be uniformly active, the thickness of this active layer of catalyst being limited, as already mentioned above, to that for which all the particles of the catalyst are exposed at least partly to the ultra-violet radiation from the source 17.

1. Photo-oxidation of isobutane and recovery of the products of the oxidation of this hydrocarbon effected on $TiO_2$.

The tests were performed with various oxides of titanium which have the features or have been prepared as follows. In order to facilitate their identification they are designated by their formulae followed by a letter and where appropriate by an index:

a. $TiO_2C$: obtained in conventional manner by the aqueous hydrolysis of titanium hydrochloride by soda; it is porous and has a large specific surface (320 m²/g);

b. $TiO_2T$ and $TiO_2T_8$: prepared by hydrolysis of alcoholate of titanium dissolved respectively in alcohol and benzene media, followed by removal of the solvent under hypercritical conditions in an autoclave. These oxides of titanium are characterised by the presence of large pores and in general by a low porosity;

c. $TiO_2D$; prepared by the method called the "flame reactor" method by drawing vapours of titanium tetrachloride into the flame of an oxyhydrogen burner, the oxide collected by electrostatic precipitation then being subjected to a treatment at 380°C for 48 hours in a current of pure and dry air.

d. $TiO_2P_n$ (n being an index which takes the values indicated below according to the operating conditions under which they are prepared, as mentioned below); the samples $TiO_2P_2$ to $TiO_2P_{17}$ in particular were obtained by thermal decomposition of propylates of titanium in an atmosphere of nitrogen:

for $TiO_2P_6$ at 730°C with a propylate delivery of 3.5 g/hour for $TiO_2P_{17}$ at 650°C with a propylate delivery of 2.2 g/hour for $TiO_2P_2$ at 730°C with a propylate delivery of 0.720 g/hour for $TiO_2P_5$ at 730°C with a propylate delivery of 1.35 g/hour for $TiO_2P_{16}$ at 650°C with a propylate delivery of 2.1 g/hour for $TiO_2P_9$ at 810°C with a propylate delivery of 1.11 g/hour The results obtained with isobutane, which is provided as a product of the oxidation of acetone, are given in table I below in which the yield of acetone (R acetone), the total yield (R total), the acetone selectively (s), the acetone activity, the acetone activity per gramme and the total activity are defined as follows:

$$R \text{ acetone} = \frac{\text{quantity of acetone}}{\text{quantity of hydrocarbon introduced}}$$

$$R \text{ total} = \frac{\text{quantity of hydrocarbon consumed}}{\text{quantity of hydrocarbon introduced}}$$

$$s = \frac{\text{quantity of acetone}}{\text{quantity of hydrocarbon introduced}}$$

The acetone activity is the quantity of acetone (expressed in micro-moles ($\mu m$)) formed per $m^2$ of catalyst and per minute.

The acetone activity per gramme is the quantity of acetone formed per gramme of catalyst and per minute.

The total activity is the total quantity of oxidation products formed per $m^2$ of catalyst and per minute.

In all the photo-oxidation tests the results of which appear in this table the composition of the mixture was as follows:

Oxygen ............... 25 %
Helium ............... 37.5 %
Hydrocarbon ......... 37.5 % the total delivery being one litre per hour. The activity measurements are made when the concentration of oxidation products, determined by chromaphotography, is constant.

desired. It could for example be constituted by nitrogen (for example in the case in which the gaseous mixture is constituted by a mixture of air and hydrocarbon). It may also be omitted. It is in this way that a gaseous mixture of the following composition was treated in accordance with the invention:

25 % oxygen and
75 % isobutane under the same conditions of delivery, irradiation and temperature as above, in the presence of the $TiO_2D$ catalyst, with the following results:

Yield of acetone : 3.3 %
Total yield : 4.4 %
Selectivity : 75 %
Acetone selectivity per $m^2$ : 6.7 $\mu m/m^2$/minute
Acetone activity per gramme : 490 $\mu m/g$/minute The possibility of effecting the reaction with mixtures having a low or no content of diluents therefore represents an industrial advantage of considerable importance, because of the possibility of performing the reaction in a plant of small volume.

2. Photocatalytic oxidation of isobutane on zinc oxide.

The tests made with isobutane, under the same conditions of delivery, irradiation, temperature etc. on a zinc oxide catalyst (specific surface = 20 $m^2/g$) ob-

TABLE I

| Catalyst | R acetone, percent | R total, percent | Selectivity, percent | Specific surface (m.²/g.) | Acetone activity ($\mu$m./m.²/min.) | Acetone activity p. gr. ($\mu$m./g./min.) | Total activity ($\mu$m./m.²/min.) |
|---|---|---|---|---|---|---|---|
| $TiO_2T$ | 3.8 | 6.6 | 57 | 120 | 2.2 | 260 | 3.8 |
| $TiO_2P_6$ | 2.5 | 3.4 | 73 | 70 | 8 | 570 | 11 |
| $TiO_2P_{17}$ | 1.7 | 2.3 | 75 | 59 | 7 | 410 | 8.8 |
| $TiO_2P_2$ | 2.4 | 3.7 | 65 | 105 | 6 | 635 | 9.4 |
| $TiO_2P_5$ | 2.9 | 4.2 | 69 | 80 | 8.4 | 710 | 12.2 |
| $TiO_2P_{16}$ | 1.7 | 2.6 | 64 | 63 | 4.7 | 390 | 9.6 |
| $TiO_2P_9$ | 2.6 | 3.7 | 66 | 92 | 7.2 | 660 | 10.9 |
| $TiO_2D$ | 2.4 | 3.2 | 73 | 70 | 4.9 | 350 | 6.7 |
| $TiO_2T_8$ | 3 | 4.6 | 64 | | | 420 | |
| $TiO_2C$ | 0.8 | 2.1 | 36 | 320 | 0.06 | 20 | 0.2 |

This table shows that all the titanium oxide catalysts used ensure production of acetone under irradiation. It also shows the important increases the catalytic activity, on the one hand, and in the selectivity, on the other hand, of the $TiO_2T$ catalysts of low porosity and in particular of $TiO_2D$ and $TiO_2P_n$ catalysts in the form of spherical particles, compared with those of the $TiO_2C$ catalyst, the catalytic action of which however is not negligible.

It will also be noted that the yields of acetone (R acetone) have been multiplied by a factor of several units for the catalysts $TiO_2C$, $TiO_2T$ and $TiO_2T_8$, when these have undergone a prior thermal treatment under the conditions described above.

For example, with $TiO_2C$ the acetone activity and the acetone activity per gramme pass respectively from 0.06 $\mu m/m^2$/min. and 20 $\mu m/m^2$/min. (table I) to 0.12 $\mu m/m^2$/min. and 40 $\mu m/g$/min. when it has been treated for 4 hours in a current of dry nitrogen or under forced vacuum at 150°C, and to 0.24 $\mu m/m^2$/min. and 80 $\mu m/m^2$/min. respectively when it has been treated for 2 hours at 200°C.

It is evident that the inert diluent of the gaseous mixture subjected to photocatalytic oxidation may be as tained in conventional manner by thermal decomposition of zinc hydroxide, led to the following results:

Acetone activity : 0.3 $\mu$moles/$m^2$/minute
Total activity : 0.6 $\mu$moles/$m^2$/minute
Selectivity : 50 %
Yield of acetone : 0.4 %
Total yield : 0.8 %

3. Photocatalytic oxidation of isobutane on other oxides.

The experiments were performed with the apparatus described above. The oxides $ZrO_2$, $MgO$, the mixtures of oxides $ZrO_2 + MgO$, obtained by hydrolysis of the corresponding alcoholates dissolved in an alcohol or benzene medium followed by removal of the solvent under hypercritical conditions in an autoclave; and the oxides $SnO_2$, $GeO_2$, the mixed oxide $SnO_2$, $Sb_2O_5$ obtained by the flame reaction method; are all found to give under irradiation a photocatalytic activity of the same order of magnitude as $TiO_2C$, in relation to the oxidation of isobutane.

It was the same in the case of alumina prepared under the particular conditions described above.

4. Photocatalytic oxidation of other hydrocarbons on $TiO_2D$.

The tests applied to n-butane under the same experimental conditions as in paragraph (1) in relation to isobutane have shown that the oxidation of this hydrocarbon provides n-butanone as oxidation product in selective manner. In particular, the following results were obtained under the above-mentioned experimental conditions:

Total yield of oxidation products : 7 %
Yield of butanone : 2 %
Selectivity : 30 %

The results indicated in Table II below were also obtained for the oxidation of propane, ethane and isobutene under the same experimental conditions.

TABLE II

| Hydrocarbons | Specific surface $m^2/g$ | Acetone activity $\mu m/m^2/min.$ | Total activity $\mu m/m^2/min.$ |
|---|---|---|---|
| Propane | 67 | 1,9 | 5,9 |
| Ethane | 67 | 0 | 5,3 |
| Isobutane | 67 | 4,8 | 8 |

Toluene treated under the same conditions gave rise to the formation of phenol.

5. Photocatalytic oxidation of hydrocarbons in the presence of water vapour.

The presence of water vapour in the gaseous mixture circulating in contact with the irradiated catalyst has a modifying effect on the selectivity of photocatalytic reaction. In particular the formation of traces of methyl-acrolein is noticed in the course of the manufacture of acetone starting with isobutane under the conditions described above.

The presence of water vapour in the treated gaseous mixture, based on oxygen and isobutane, is accompanied by an increase in the quantities of methyl-acrolein formed without the quantities of acetone formed being affected.

There is thus obtained a novel process for the oxidation of hydrocarbons which has numerous advantages both as regards the facility of its performance and the possibilities that it offers in relation in particular to the manufacture of numerous oxidation products of hydrocarbons. Amongst the foremost of these advantages there may be mentioned:

the reaction can be performed at normal temperature, the reaction is very selective, particularly in contact with catalysts in the form of spherical particles. For example, in the case of the oxidation of isobutane the greater part of the hydrocarbon that has been subjected to oxidation is converted into acetone, if the yield from conversion of the hydrocarbon in the mixture is not very appreciable in the course of a single "pass" the gaseous mixture may be recycled into the reactor several times, where necessary, after separation of the products of oxidation, the quantity of products of the oxidation of the hydrocarbon capable of being formed per gramme of catalyst may be considerable, taking into account in particular the high values that may be attained by the acetone activity (or of the corresponding oxidation product) per gramme of catalyst and because the same catalyst may be used for extremely prolonged periods, even when separated by interruptions of operation, without undergoing poisoning (in particular the activities of the catalysts used in the above-described tests did not undergo change at the end of 10 hours operation). The yields could be considerably increases still further by using more powerful sources of UV radiation, expecially in the wave domain for which the quantic yield is a maximum.

the reaction can be performed in plant of small volume, etc.

What we claim is:

1. Process for oxidizing hydrocarbons into aldehydes and ketones, which comprises irradiating with an ultra-violet radiation a catalyst constituted of an oxide selected from the group consisting of $TiO_2$, $nO$ and mixtures thereof, said ultra-violet radiation having a spectrum at least a major portion of which is within the domain of wave-lengths lower than the wave-lengths of the radiations whose energy is that of the forbidden bandwidth of said oxide, causing said hydrocarbon in admixture with an oxygen containing gas to continuously flow into contact with said irradiated catalyst at a temperature below 100°C, to oxidize said hydrocarbon, and continuously recovering a gas mixture containing oxidized hydrocarbons which has been in contact with said catalyst.

2. Process according to claim 1, wherein said circulation or continuous flow is produced at ambient temperature.

3. Process according to claim 1, wherein the catalyst has a low porosity.

4. Process according to claim 1, wherein the wavelengths of the ultra-violet radiation are between about 2,200 and about 3,900 A.

5. Process according to claim 1, wherein the hydrocarbon subjected to oxidation is constituted by a saturated hydrocarbon having at least three carbon atoms or a branched unsaturated hydrocarbon.

6. Process according to claim 1, wherein the hydrocarbon is selected from the group consisting of isobutane, isobutene, n-butane, propane, toluene.

7. Process according to claim 5, wherein the gaseous mixture also contains water vapour.

8. Process according to claim 7, wherein the hydrocarbon subjected to the oxidation is isobutane.

9. Process for oxidizing hydrocarbons in the gaseous or vapor state selected from the group of saturated hydrocarbons having at least three carbon atoms and of gaseous branched unsaturated hydrocarbons into products of oxidation, comprising aldehydes and ketones; irradiating a titanium dioxide catalyst with ultra-violet radiation at least a major portion of which is within the domain of wave-lengths between 2,200 A and 3,900 A, continuously flowing said hydrocarbons in admixture with an oxygen containing gas into contact with said irradiated catalyst, to oxidize said hydrocarbons at a temperature between ambient and 100°C; and continuously collecting the gas mixture containing said products of oxidation which has been in contact with said catalyst.

10. Process according to claim 9, wherein the ultraviolet radiation wavelengths are between 2,700 and 3,400 A.

* * * * *

UNITED STATES PATENT OFFICE
CERTIFICATE OF CORRECTION

Patent No. 3,781,194           Dated December 25, 1973

Inventor(s) Francois Juillet, Stanislas Teichner, Marc Formenti

It is certified that error appears in the above-identified patent and that said Letters Patent are hereby corrected as shown below:

In the Claims:

Claim 1, line 4, change "$TiO_2$, nO" to ...$TiO_2$, $ZnO$...

Signed and sealed this 1st day of October 1974.

(SEAL)
Attest:

McCOY M. GIBSON JR.
Attesting Officer

C. MARSHALL DANN
Commissioner of Patents